(12) United States Patent
Sinha

(10) Patent No.: US 8,000,098 B1
(45) Date of Patent: Aug. 16, 2011

(54) MULTIFACETED LAPTOP ACCESSORY

(76) Inventor: Manoj Sinha, Columbus, OH (US)

( * ) Notice: Subject to any disclaimer, the term of this patent is extended or adjusted under 35 U.S.C. 154(b) by 0 days.

(21) Appl. No.: 12/795,550

(22) Filed: Jun. 7, 2010

(51) Int. Cl.
*H05K 5/00* (2006.01)
*H05K 7/00* (2006.01)

(52) U.S. Cl. ........... 361/679.41; 361/679.27; 361/679.3; 361/679.55; 361/679.56; 710/303; 710/304

(58) Field of Classification Search ............. 361/679.27, 361/679.3, 679.41, 679.55, 679.56, 679.46, 361/679.48, 679.49, 688, 704; 710/303, 710/304
See application file for complete search history.

(56) References Cited

U.S. PATENT DOCUMENTS

| | | | | |
|---|---|---|---|---|
| 5,604,663 | A * | 2/1997 | Shin et al. | 361/679.43 |
| 6,359,994 | B1 * | 3/2002 | Markow et al. | 381/333 |
| 7,502,225 | B2 * | 3/2009 | Solomon et al. | 361/679.41 |

* cited by examiner

*Primary Examiner* — Jayprakash N Gandhi
*Assistant Examiner* — Anthony M Haughton

(57) ABSTRACT

A laptop docking apparatus having a base and lap rest. The base has an internal duct and fan for venting heat away from the underside of the laptop as well as an accessory bay for removable hard drives or the like, as well as a removable battery to power the device and the laptop. The laptop rest is connectable to the base and has a keyboard, mouse, and internal speakers.

1 Claim, 13 Drawing Sheets

MULTIFACETED LAPTOP ACCESSORY

CROSS REFERENCE TO RELATED APPLICATIONS

Not Applicable

FEDERALLY SPONSORED RESEARCH

Not Applicable

SEQUENCE LISTING, TABLE, OR COMPUTER PROGRAM COMPACT DISK APPENDIX

Not Applicable

CLAIM OF PRIORITY BASED ON COPENDING APPLICATION

Not Applicable

BACKGROUND AND SUMMARY

The present invention relates generally to laptop computer accessories and specifically to laptop pads and docking stations. In one embodiment, a laptop docking apparatus comprises a portable base and a lap rest (aka lap desk). The portable base is substantially planar to accommodate a laptop computer and can function independently or work with a lap rest.

The base comprises upper and lower surfaces. In one embodiment, the upper surface of the base is ventilated to facilitate removing heat from the underside of the laptop. In another embodiment, the upper surface is made of a heat conducting material to cool the laptop. The lower surface of the base can be made of metal or plastic material of either non conducting or heat conducting material and is capable of connecting to the lap rest.

In one embodiment, the base has an internal duct in communication with a vent in the upper surface to allow vertical air flow therethrough. The air flow is horizontally discharged between the upper and lower surfaces. The base has a fan for inducing airflow through the internal duct. Additionally, the upper surface of the base is in thermal communication with the internal duct.

The base has an accessory bay for any one of a hard disk, an optical drive, or similar device; and a video port and controller for providing a video output signal from the accessory bay. The base has a universal serial bus port and controller for communication between the accessory bay and an external device; and a wireless communication component for wireless communication between the accessory bay and an external device.

The base has a removable battery housed therein which is rechargeable from an external source and further is cable of providing power to a connector housed within the base, the universal serial bus port, the fan, and the accessory bay.

The lap rest is substantially planar and has upper and lower surfaces. In one embodiment, the base is attached to the top of the lap rest. In another embodiment, the base fits inside of a recess in the lap rest.

The lap rest upper surface is removably connectable with the base. The lap rest lower surface comprises a cushion for added comfort when placed on the lap of a person. The cushion can be enlarged laterally to provide a hand rest as the user types on the lap rest keyboard. The lap rest upper surface has a built in keyboard and mouse and at least one speaker in communication an audio port.

The lap rest has a universal serial bus port and controller for communication between the speaker, keyboard, mouse pad, and an external device. The lap rest has a wireless communication component for communication between the speaker, keyboard, mouse pad, and an external device.

In one embodiment, a central processing unit is incorporated in either or both of the base and lap rest to run and maintain the various components of the device (inbuilt fan, optical device or hard drive, usb port, speaker, wireless port, keyboard, and built in mouse pad) as well as external components or devices (e.g. Laptop or desktop computer, ipad (trademark), iphone (trademark), ipod (trademark), blackberry (trademark), etc.

REFERENCE NUMERALS IN DRAWINGS

Figure 1:
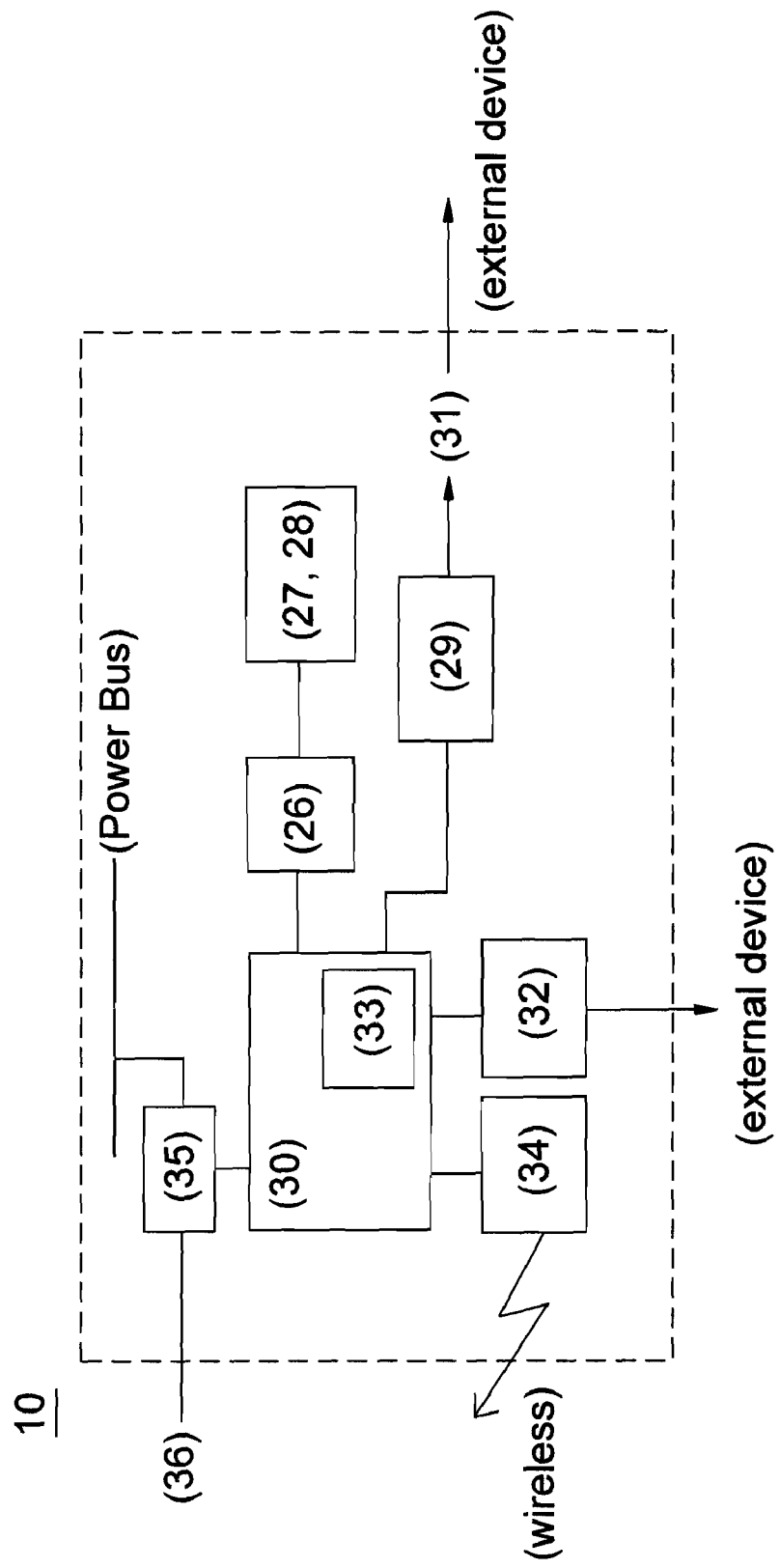
FIG. 1 depicts a block diagram of one embodiment of the invention
Figure 2:
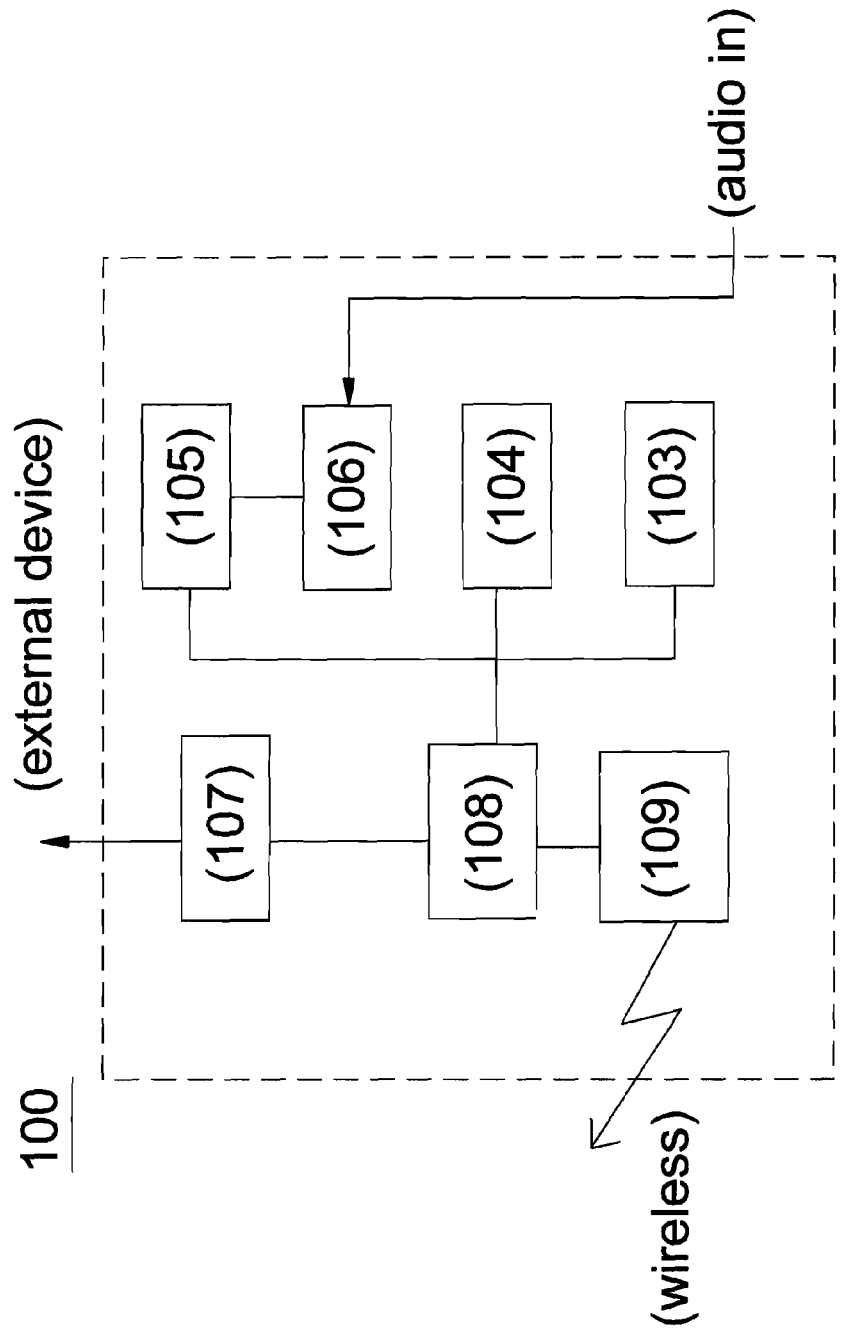
FIG. 2 depicts a block diagram of one embodiment of the invention
Figure 3:
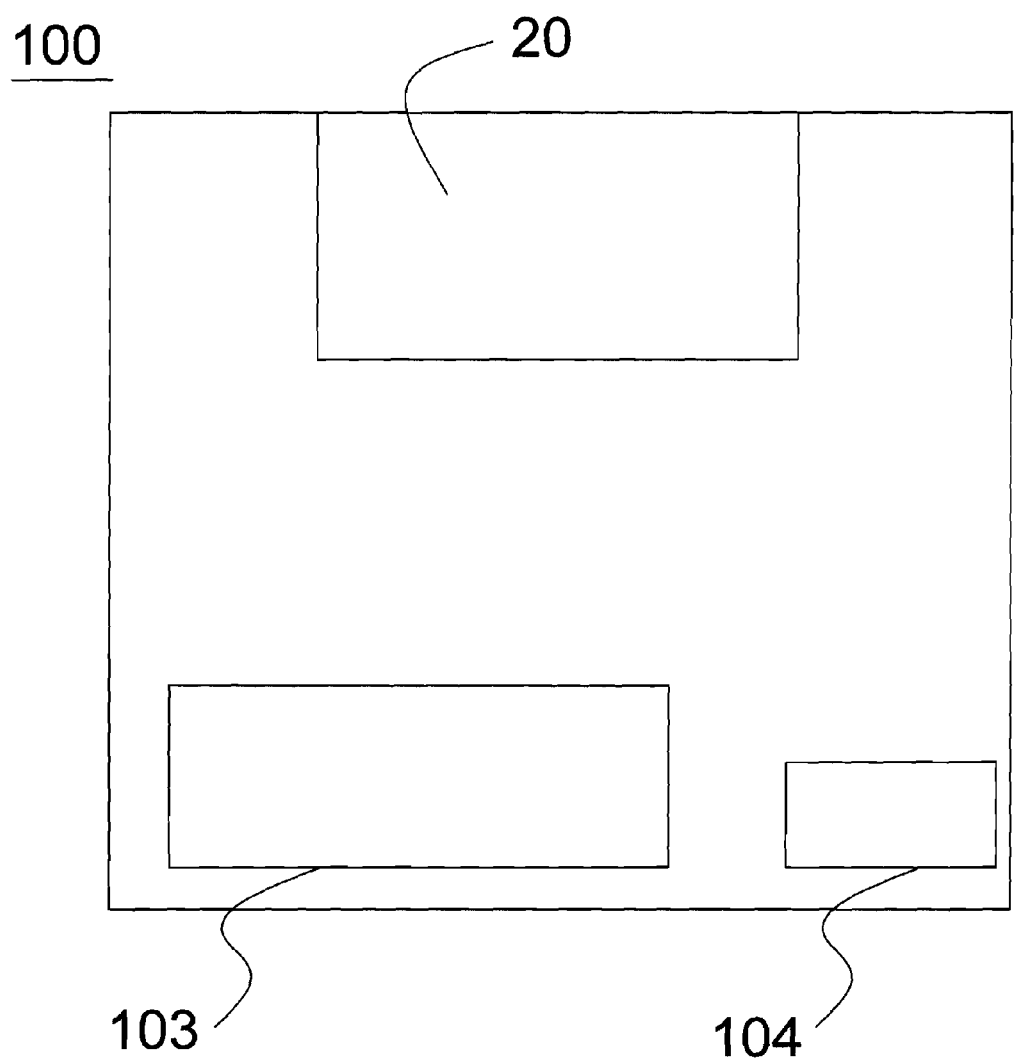
FIG. 3 depicts a block diagram of one embodiment of the invention
Figure 4:
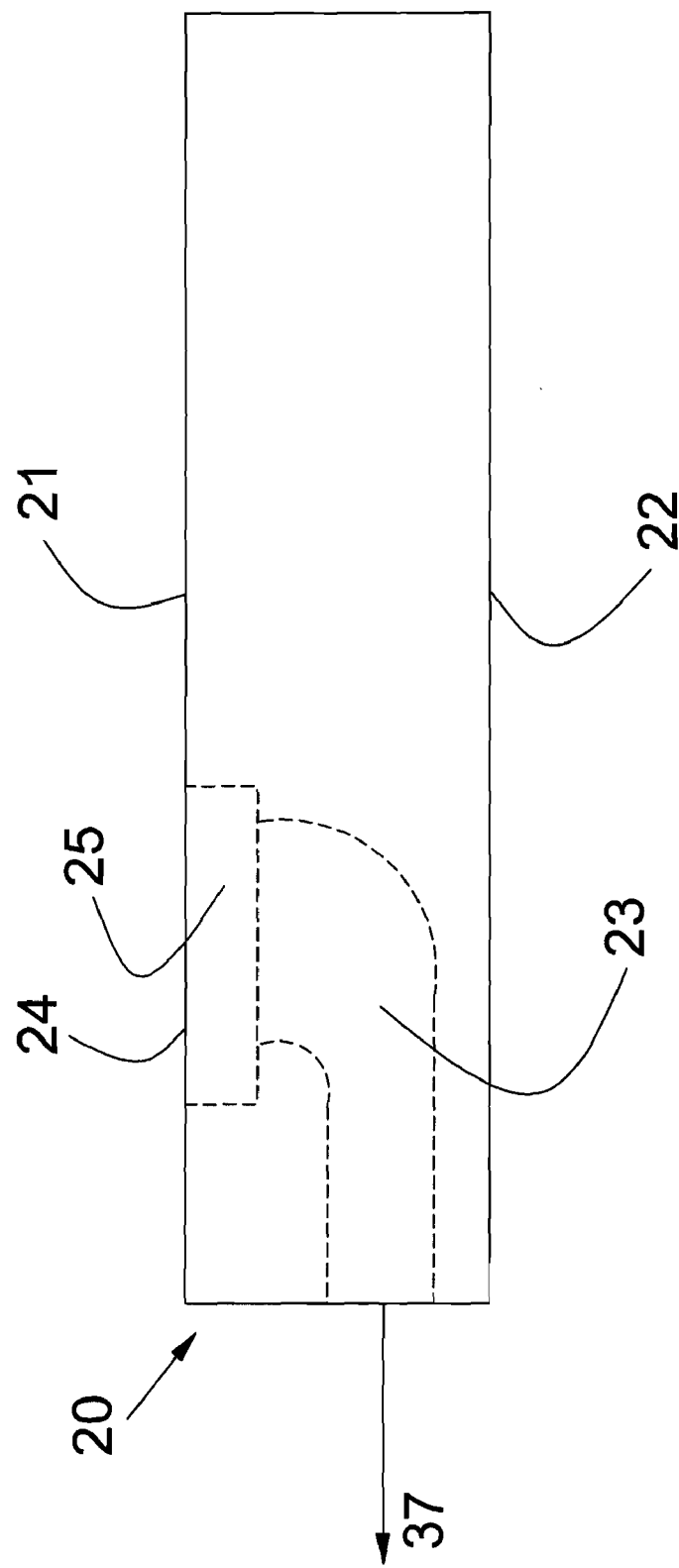
FIG. 4 depicts a block diagram of one embodiment of the invention
Figure 5:
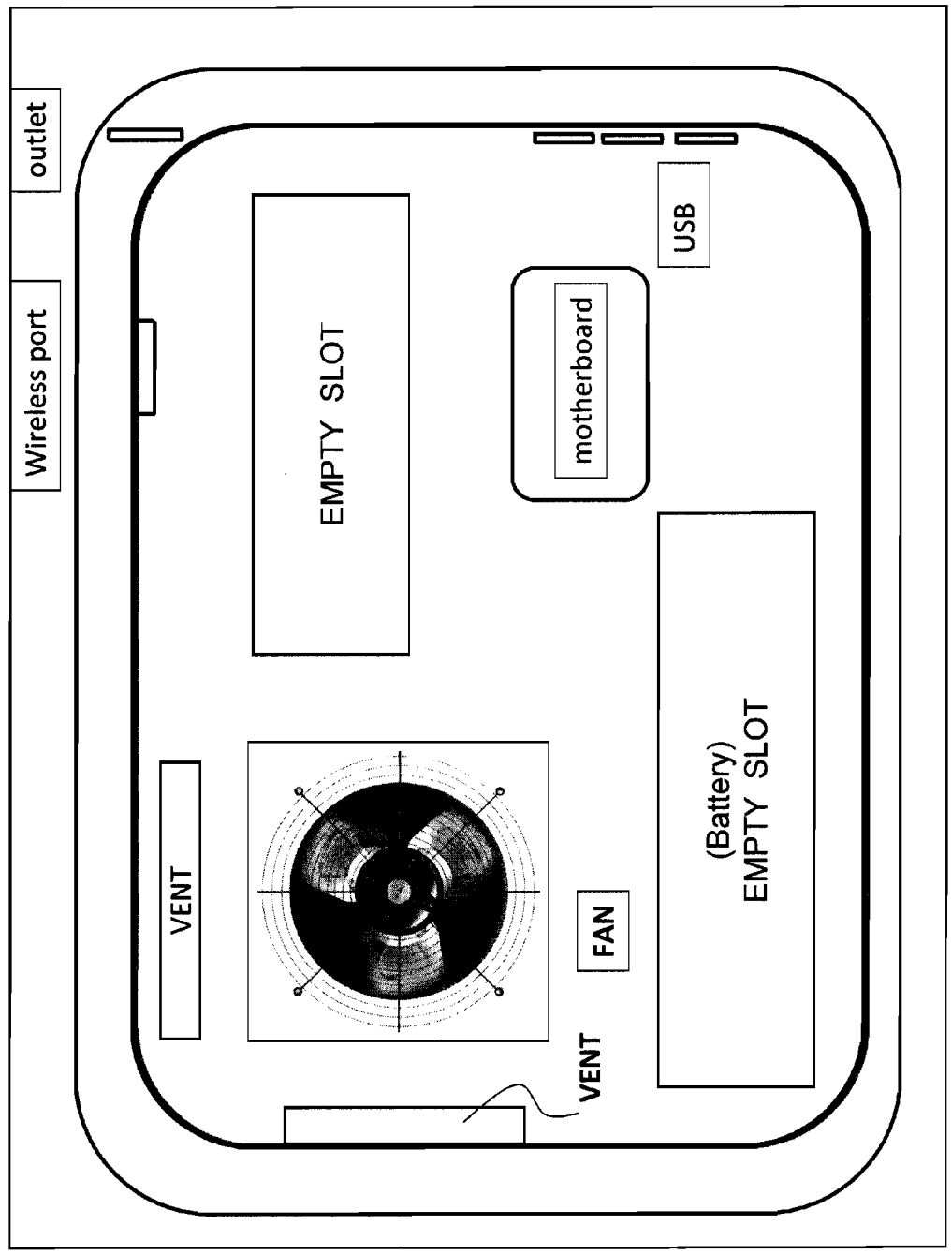
FIG. 5 depicts a block diagram of one embodiment of the invention
Figure 6:
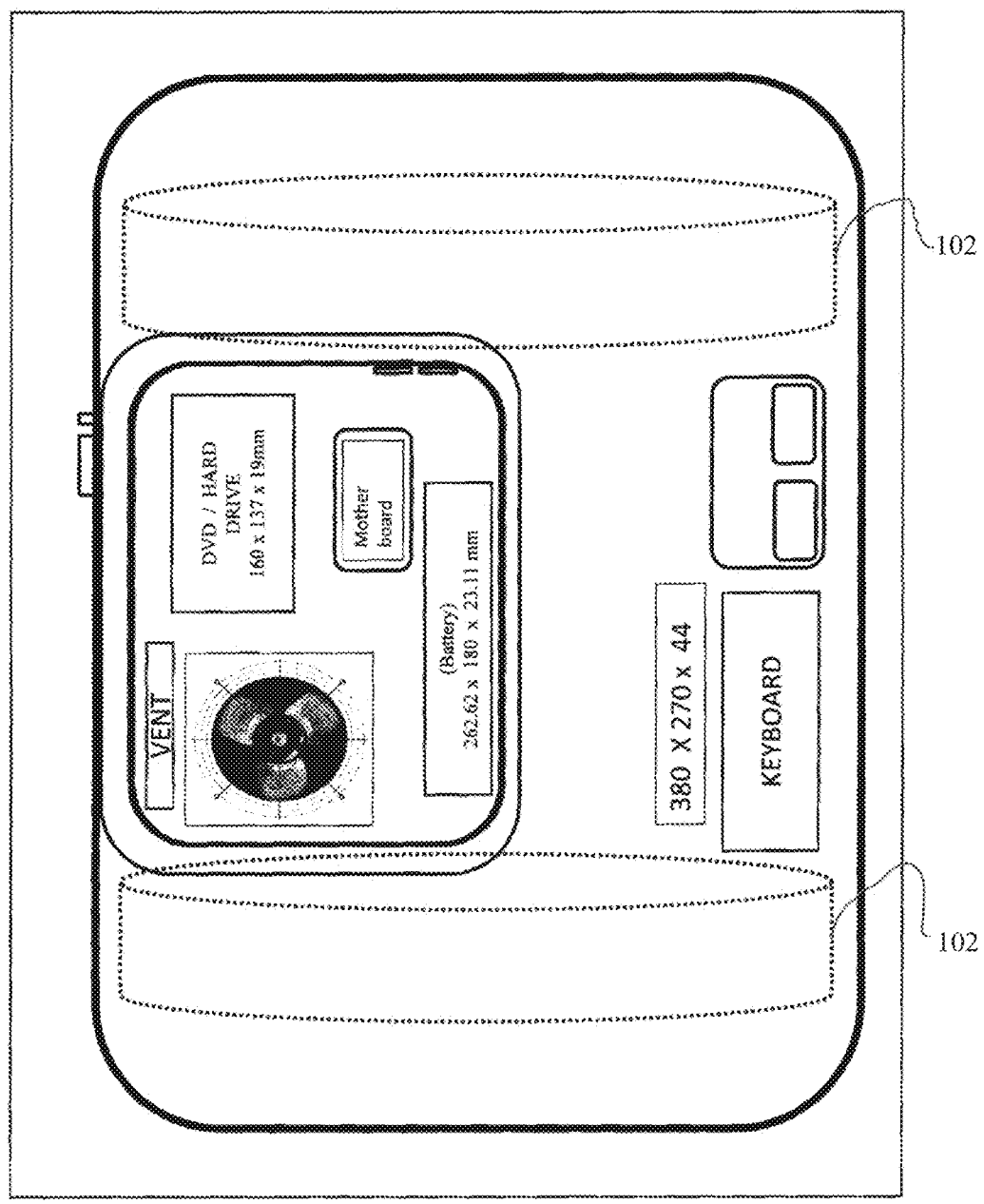
FIG. 6 depicts a block diagram of one embodiment of the invention
Figure 7:
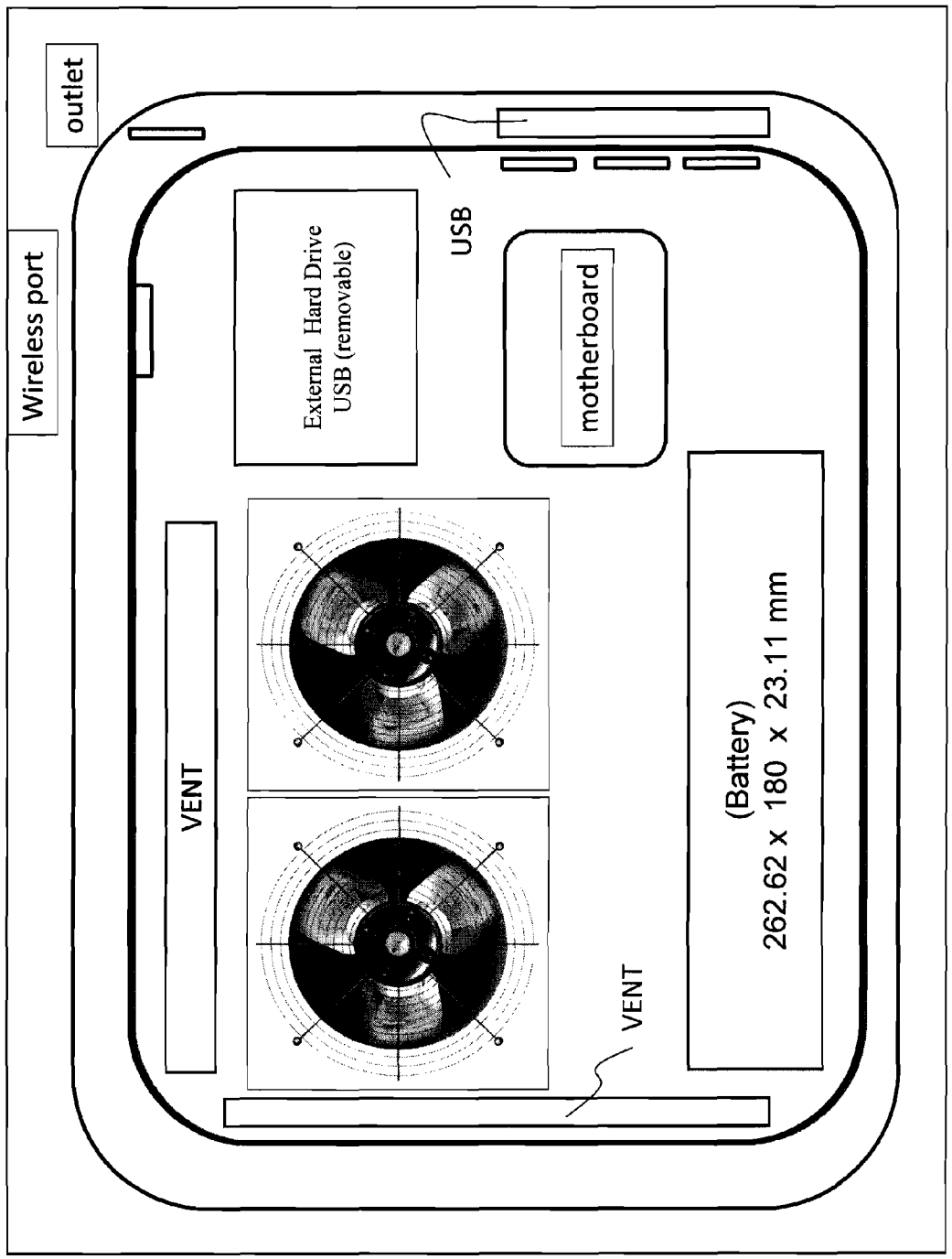
FIG. 7 depicts a block diagram of one embodiment of the invention
Figure 8:
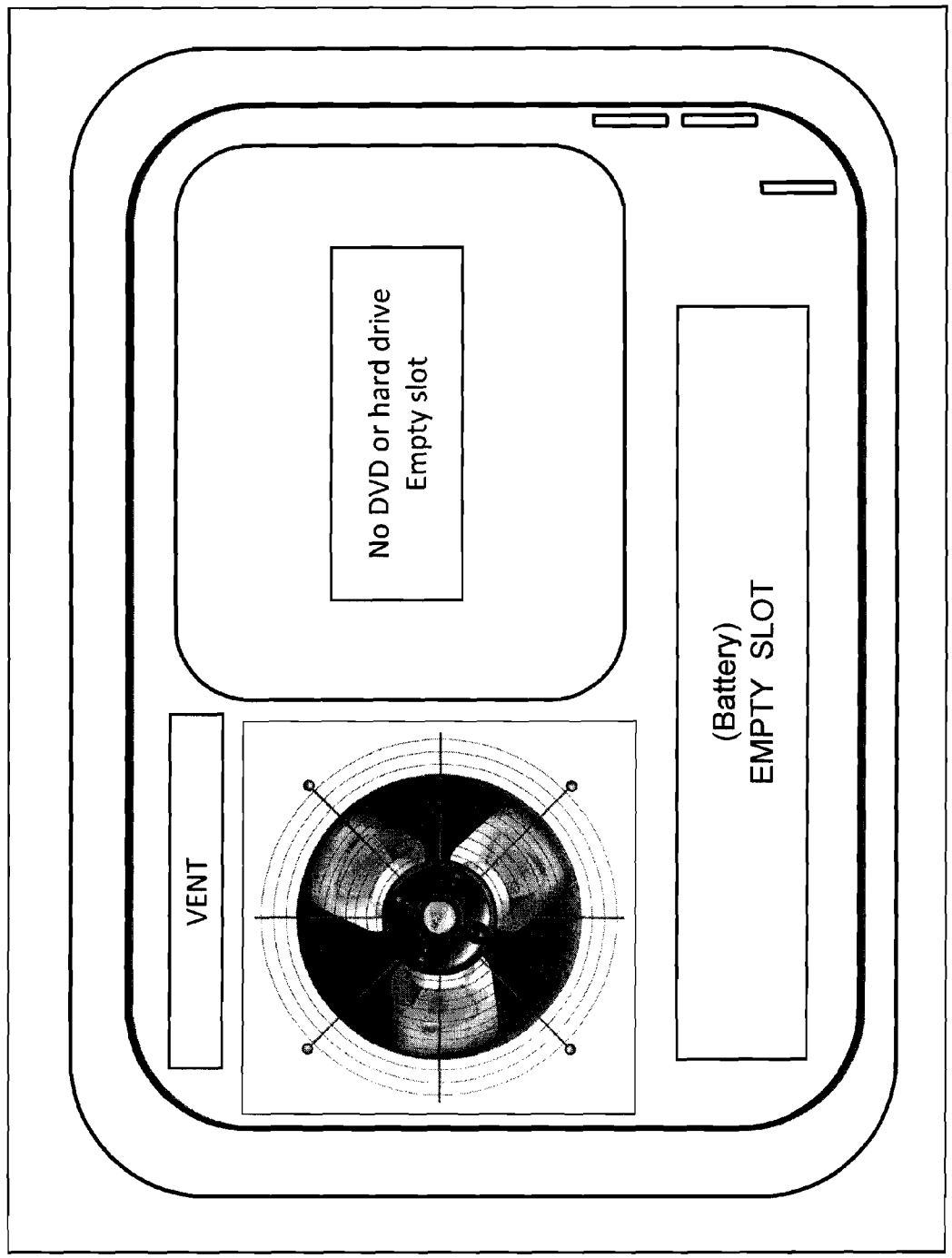
FIG. 8 depicts a block diagram of one embodiment of the invention
Figure 9:
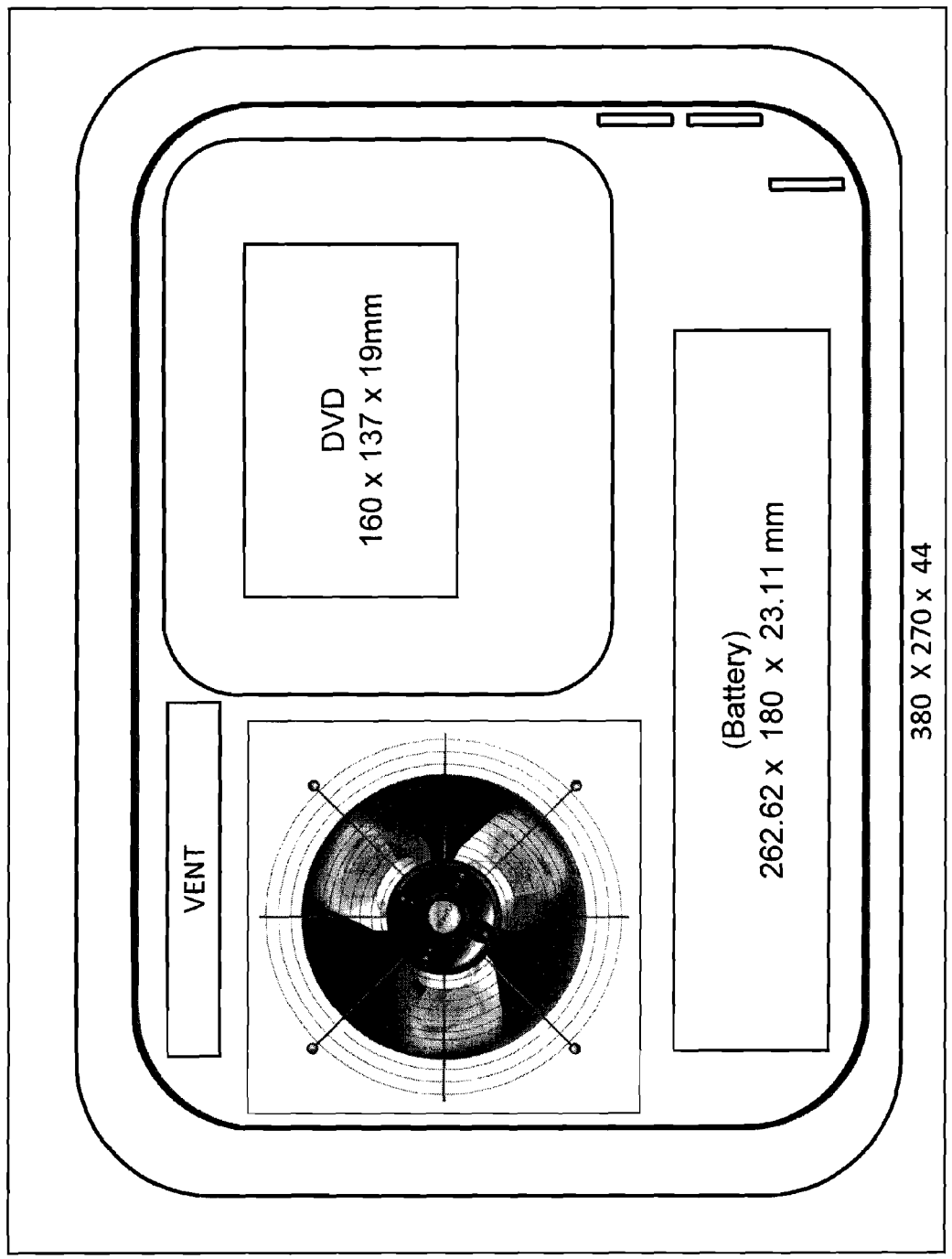
FIG. 9 depicts a block diagram of one embodiment of the invention
Figure 10:
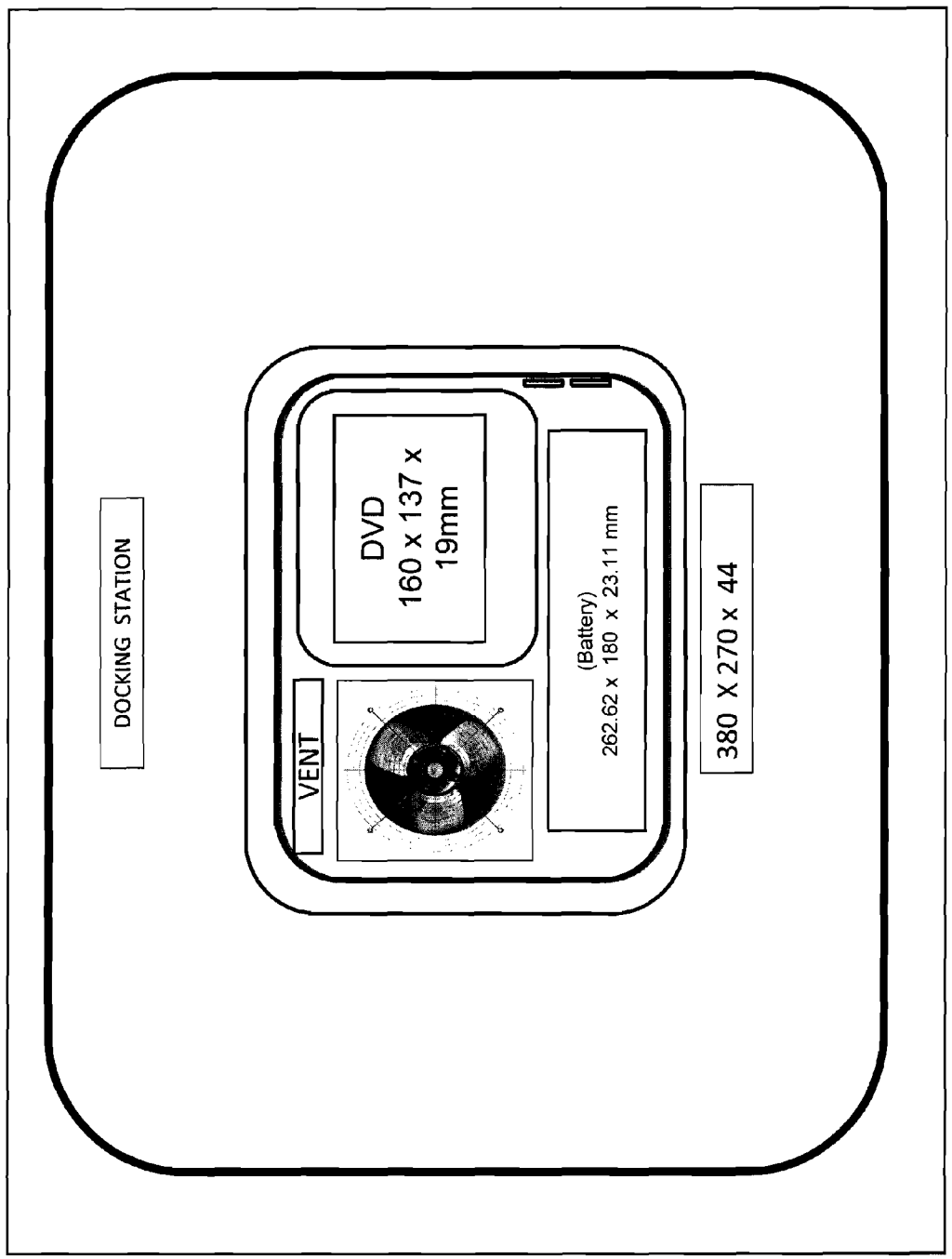
FIG. 10 depicts a block diagram of one embodiment of the invention
Figure 11:
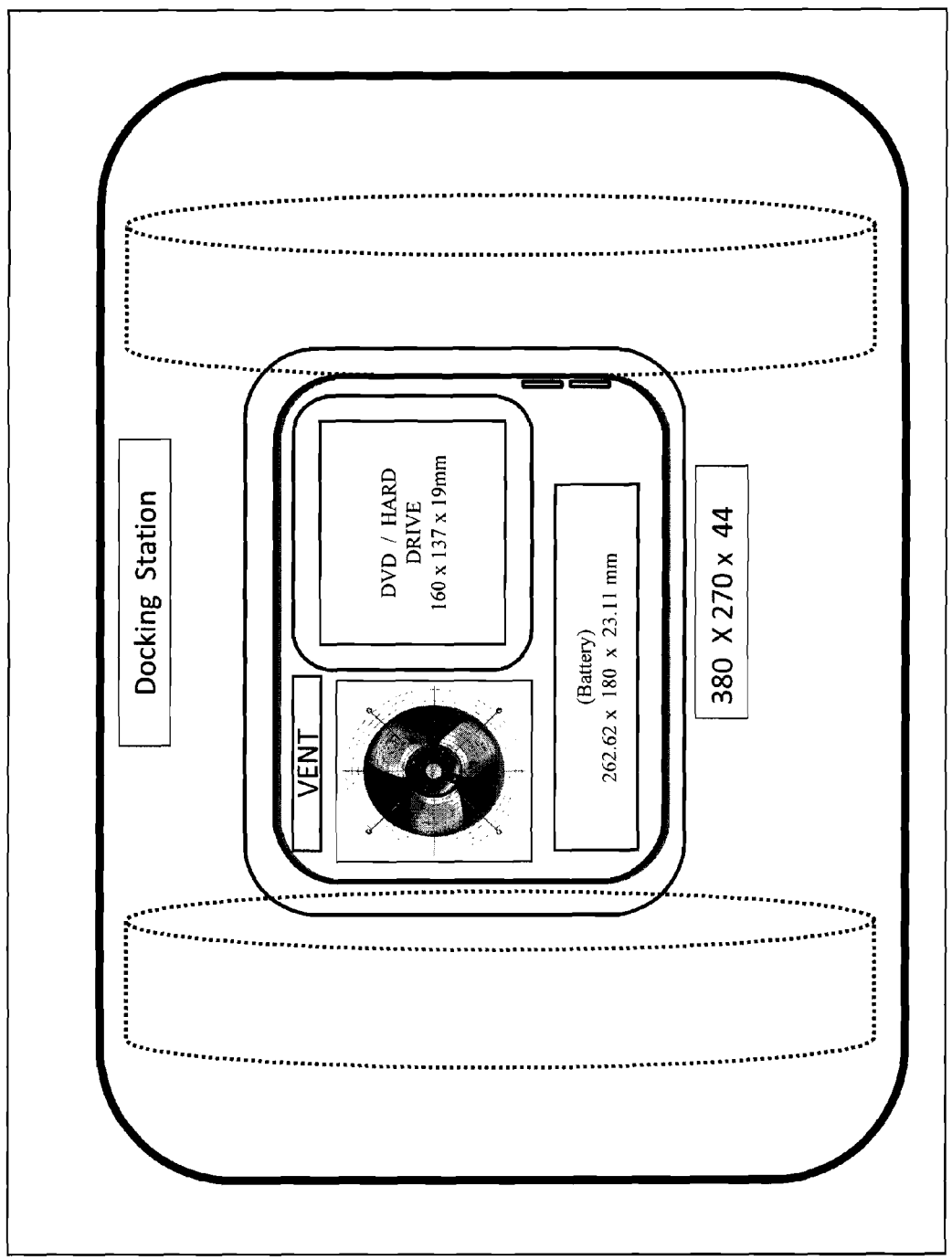
FIG. 11 depicts a block diagram of one embodiment of the invention
Figure 12:
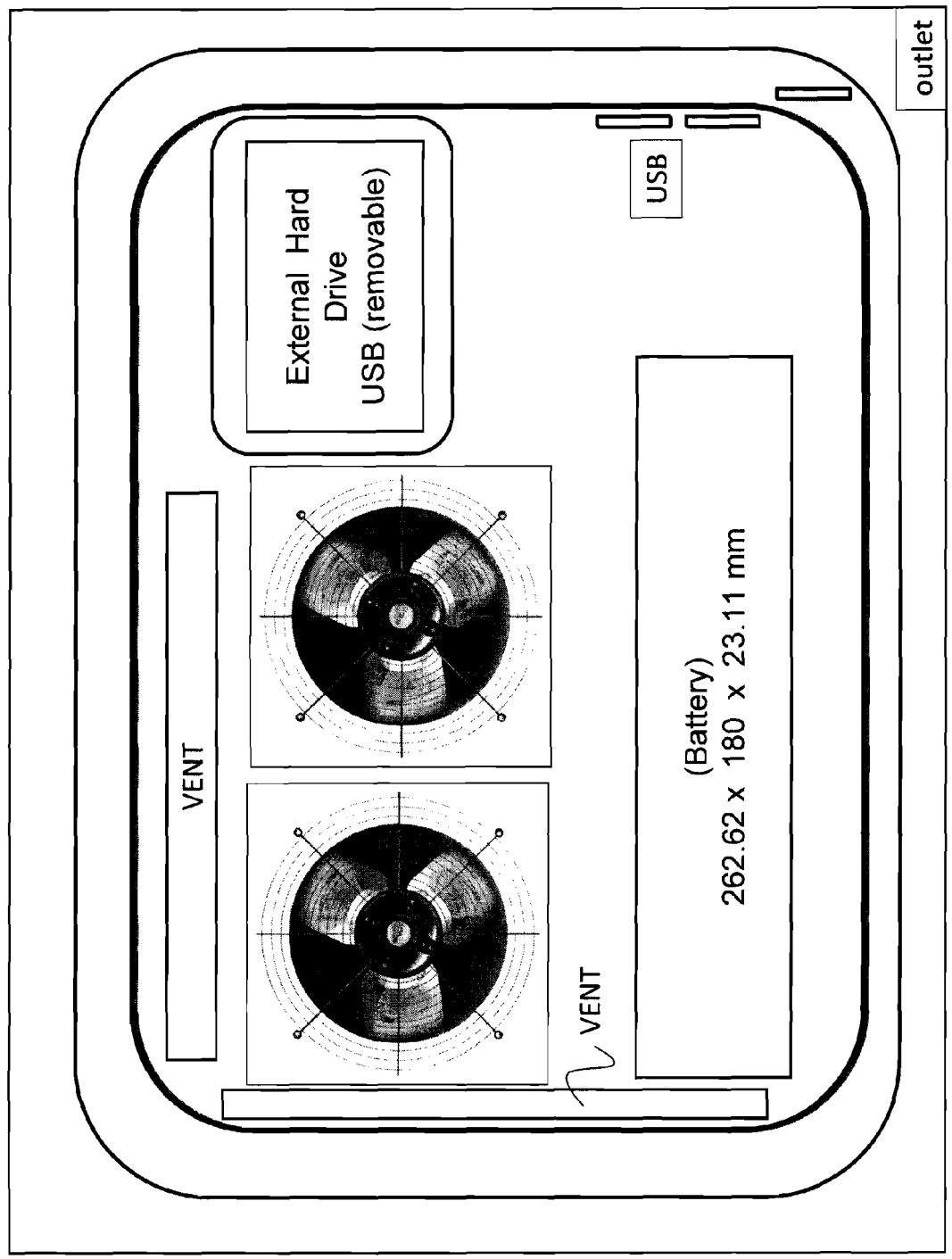
FIG. 12 depicts a block diagram of one embodiment of the invention
Figure 13:
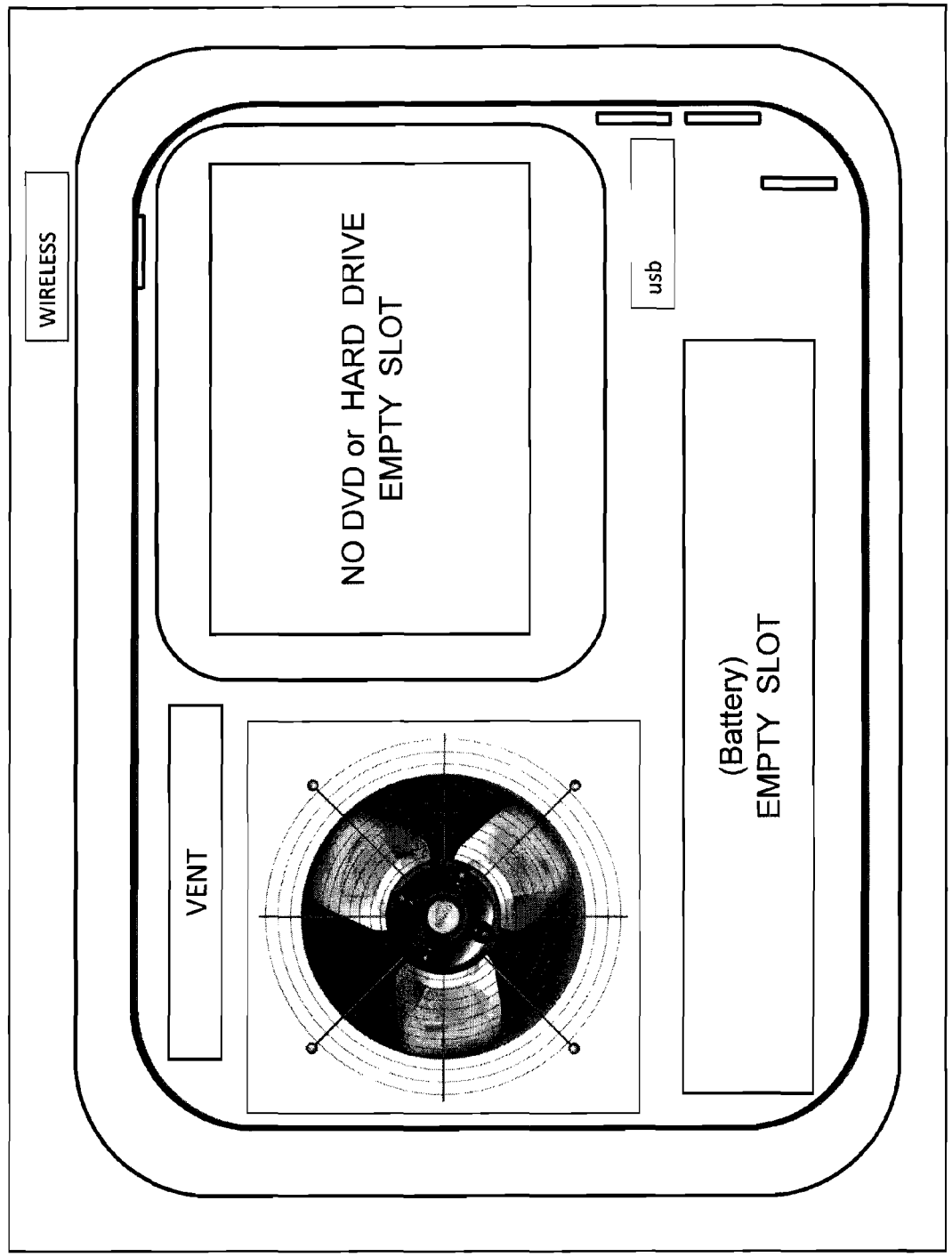
FIG. 13 depicts a block diagram of one embodiment of the invention

The table below lists the reference numerals employed in the figures, and identifies the element designated by each numeral.
10 docking apparatus 10
20 base 20
21 upper surface 21 of base
22 lower surface 22 of base
23 internal duct 23 of base
24 vent 24 in upper surface of base
25 fan 25 of base
26 accessory bay 26 of base
27 hard disk 27
28 optical drive 28
29 video port 29 of base
30 controller 30 of base
31 video output signal 31
32 universal serial bus port 32 of base
33 universal serial bus port controller 33 of base
34 wireless communication component 34 of base
35 removable battery 35 of base 36 connector 36 of base
37 arrow 37
100 lap rest 100
101 upper surface 101 of lap rest
102 lower surface 102 of lap rest
103 keyboard 103 of lap rest
104 mouse pad 104 of lap rest
105 speaker 105 of lap rest
106 audio port 106 of lap rest
107 universal serial bus port 107 of lap rest
108 universal serial bus port controller 108 of lap rest
109 wireless communication component 109 of lap rest

DETAILED DESCRIPTION

One embodiment of an autonomous portable multitasking docking apparatus (a.k.a. docking apparatus) comprises a docking apparatus 10 having a base 20 and a lap rest 100.

Base 20 is substantially planar and has upper and lower surfaces (21, 22)

and an internal duct 23 in communication with a vent 24 in upper surface 21 to allow vertical air flow therethrough. The air flow is horizontally discharged between upper and lower surfaces 21 & 22 as indicated by arrow 37.

Base 20 has a fan 25 for inducing airflow through internal duct 23.

Upper surface 21 of base 20 is made of a heat conducting material and is capable of providing support for a laptop computer.

Upper surface 21 of base 20 is in thermal communication with internal duct 23.

Base 20 has an accessory bay 26 for any one of a hard disk 27, or an optical drive 28 or other removable device such as optical drive, CD, DVD, or blue ray disc player.

Base 20 has a video port 29 and controller 30 for providing a video output signal 31 from accessory bay 26.

Base 20 has a universal serial bus port (USB) 32 and USB controller 33 for communication between accessory bay 26 and an external device (e.g. keyboard, mouse, hard drive).

Base 20 has a wireless communication component 34 for wireless communication between accessory bay 26 and an external device and/or controller 30.

Base 20 has a removable battery 35 housed therein which is rechargeable from an external source and further is cable of providing power to connector 36 (housed within base 20), universal serial bus port 32, fan 25, and accessory bay 26.

Lap rest 100 is substantially planar and has upper and lower surfaces 101, 102.

Lap rest 100 upper surface 101 is attachable to lower surface 22 of base 20.

Lap rest 100 lower surface 102 comprises a cushion.

Lap rest 100 upper surface has a built in keyboard 103 and mouse 104. The keyboard can be a conventional hardware based with actual keys or alternatively utilizing virtual keys such as touch pad based, optical, etc.

Lap rest 100 has at least one speaker 105 in communication with an audio port 106 housed within the lap rest.

Lap rest 100 has a universal serial bus port 107 and controller 108 for communication between speaker 105, keyboard 103, mouse pad 104, and an external device (e.g. docking apparatus 10). The USB controller 108 can act as a USB hub for the speaker, keyboard, and mouse.

Lap rest 100 has a wireless communication component 109 for communication between speaker 105, keyboard 103, mouse pad 104, and an external device.

What is claimed is:

1. A docking apparatus comprising a base and a lap rest;
    the base being substantially planar and having upper and lower surfaces;
    the base having an internal duct in communication with a vent in the upper surface to allow vertical air flow therethrough, the air flow being horizontally discharged between the upper and lower surfaces;
    the base having a fan for inducing airflow through the internal duct;
    the upper surface of the base being made of a heat conducting material and being capable of providing support for a laptop computer;
    the upper surface of the base being in thermal communication with the internal duct;
    the base having an accessory bay for any one of a hard disk, or an optical drive;
    the base having a video port and controller for providing a video output signal from the accessory bay;
    the base having a universal serial bus port and controller for communication between the accessory bay and an external device;
    the base having a wireless communication component for wireless communication between the accessory bay and an external device;
    the base having a removable battery housed therein,
        the battery being rechargeable from an external source and further being capable of providing power to
            a connector housed within the base, the universal serial bus port, the fan, and the accessory bay;
    the lap rest being substantially planar and having upper and lower surfaces;
    the lap rest upper surface being removably connected to the lower surface of the base;
    the lap rest lower surface comprising a cushion;
    the lap rest upper surface having a built in keyboard and mouse;
    the lap rest having at least one speaker in communication with an audio port housed within the lap rest;
    the lap rest having a universal serial bus port and controller for communication between the speaker, keyboard, mouse pad, and an external device;
    the lap rest having a wireless communication component for communication between the speaker, keyboard, mouse pad, and an external device.

* * * * *